United States Patent [19]

Hsia et al.

[11] Patent Number: 4,573,865

[45] Date of Patent: Mar. 4, 1986

[54] MULTIPLE-IMPINGEMENT COOLED STRUCTURE

[75] Inventors: Edward S. Hsia, Cincinnati; Raghuram J. Emani; John H. Starkweather, both of West Chester, all of Ohio

[73] Assignee: General Electric Company, Cincinnati, Ohio

[21] Appl. No.: 595,754

[22] Filed: Apr. 2, 1984

Related U.S. Application Data

[62] Division of Ser. No. 297,688, Aug. 31, 1981, Pat. No. 4,526,226.

[51] Int. Cl.[4] .......................... F02C 7/18; F04D 29/58; F01D 25/12

[52] U.S. Cl. .................................. 415/115; 165/109.1; 165/908; 415/219 R; 416/97 R

[58] Field of Search .................. 415/115, 116, DIG. 1, 415/219 R; 416/97 R, 97 A; 165/109, DIG. 11, 109 R

[56] References Cited

U.S. PATENT DOCUMENTS

| | | | |
|---|---|---|---|
| 3,348,622 | 10/1967 | Papst | 415/DIG. 1 |
| 3,597,102 | 8/1971 | Unsworth et al. | 415/DIG. 1 |
| 3,728,039 | 4/1973 | Plemmons et al. | 415/115 |
| 3,825,364 | 7/1974 | Halila et al. | 415/116 |
| 3,975,901 | 8/1976 | Hallinger et al. | 415/115 X |
| 4,177,004 | 12/1979 | Riedmiller et al. | 415/116 |
| 4,465,429 | 8/1984 | Martin et al. | 415/115 X |

*Primary Examiner*—Sheldon J. Richter

*Attorney, Agent, or Firm*—Gregory A. Welte; Derek P. Lawrence

[57] ABSTRACT

A multiple-impingement cooled structure, such as for use as a turbine shroud assembly. The structure includes a plurality of baffles which define with an element to be cooled, such as a shroud, a plurality of cavities. Impingement cooling air is directed through holes in one of the baffles to impinge upon only the portion of the shroud in a first cavity. That cooling air is then directed to impinge again upon the portion of the shroud in a second cavity.

4 Claims, 5 Drawing Figures

MULTIPLE-IMPINGEMENT COOLED STRUCTURE

This is a division of application Ser. No. 297,688, filed Aug. 31, 1981, now U.S. Pat. No. 4,526,226.

BACKGROUND OF THE INVENTION

1. Field of the Invention

This invention relates to structural cooling and particularly to a new and improved multiple-impingement cooled structure, such as for use as a turbine shroud assembly.

2. Description of the Prior Art

Structures, such as turbine shrouds and nozzle bands, which are subjected to high temperatures must be cooled in order to reduce possible damage caused by undesirable thermal expansion and to maintain satisfactory sealing characteristics. Several methods of cooling such structures are currently being successfully employed.

One method is film cooling. In film cooling, a thin film of cooling fluid, such as air, is directed to flow along and parallel to the surface which is to be cooled. Although film cooling provides excellent cooling, when used adjacent a gas stream, such as along the inner surface of a turbine shroud in the turbine section of an engine, the film cooling air mixes with the gases in the gas stream. The momentum of the film cooling air is lower than the momentum of gases with which it mixes and thus the resultant overall momentum of the mixed gas stream is lowered. Also, the mixing of the film cooling air with the gases in the gas stream imparts some turbulence to the gas stream. The net result of the mixing of the film cooling air with the gas stream is, in the case of the turbine section of an engine, that there is less work available to rotate the turbine rotor and thus turbine efficiency is decreased. Correspondingly, the greater the amount of film cooling air used, the greater will be the turbine efficiency decrease caused by mixing losses.

Another method of cooling structures is impingement cooling. In impingement cooling, air is directed to impinge substantially perpendicularly upon the surface of a structure to be cooled. When used on a turbine shroud, for example, cooling air is directed to impinge upon the back or outer surface of the shroud, that is, the surface not facing the gas flowpath. The source of the cooling air for both impingement and film cooling air in most gas turbine engines is high pressure air from the compressor. For effective impingement cooling of the entire turbine shroud in current impingement cooling arrangements, a relatively large amount of cooling air must be employed and thus the compressor must work harder to supply the cooling air. Thus, when a large amount of cooling air is required for impingement cooling, engine efficiency is reduced.

In view of the above-mentioned problems, it is therefore an object of the present invention to provide a structure having a unique configuration whereby it can be satisfactorily cooled with a reduced amount of film cooling air to thereby reduce mixing losses.

Another object of the present invention is to provide a structure configured whereby impingement cooling air is directed to impinge more than once upon an element of the structure to be cooled, thus requiring a reduced amount of cooling air and thereby increasing engine efficiency.

BRIEF DESCRIPTION OF THE DRAWING

This invention will be better understood from the following description taken in conjunction with the accompanying drawing, wherein.

SUMMARY OF THE INVENTION

The present invention comprises a multiple-impingement cooled structure. The structure comprises an element to be cooled and a plurality of baffles having impingement holes therethrough. The baffles partially define with portions of the element a plurality of cavities. The baffles and cavities are arranged for directing cooling fluid from a source thereof to impinge sequentially upon the portion of the element within each of the cavities. The structure also includes fluid communication means between at least one of the cavities and the exterior of the structure.

In a particular embodiment of the structure of the present invention, the element which is to be cooled includes flanges near the ends thereof and a rib between the flanges. A first baffle extends between the flanges and a second baffle extends between the rib and a flange. Cooling air is directed to impinge upon the portion of the element in a first cavity and then upon the portion of the element in a second cavity.

In another embodiment of the invention, the structure includes three baffles and three cavities.

DESCRIPTION OF THE PREFERRED EMBODIMENT

Figure 1:
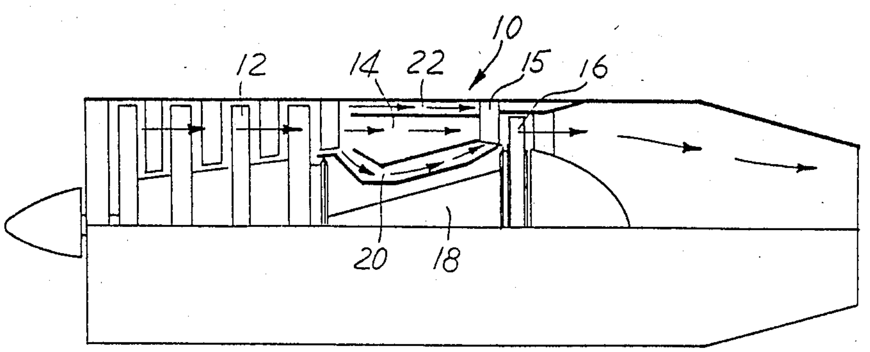
FIG. 1 is a view of the upper half of a gas turbine engine with a portion cut away to show some engine components therein.

Turning now to a consideration of the drawing, and in particular to FIG. 1, there is shown the upper half of a gas turbine engine 10 in which the present invention can be incorporated. Within the gas turbine engine 10, air which enters the engine is compressed by the compressor 12. A portion of the high pressure air then flows into the combustor 14 wherein it is mixed with fuel and burned. The resulting expanding hot gases flow between the turbine nozzle vanes 15 and across the turbine blades 16 causing the blades and thus the turbine rotor 18 to rotate. Another portion of the high pressure air is used as cooling air to cool the combustor walls and the turbine components. That cooling air flows through the plenums 20 and 22 disposed radially inwardly and outwardly, respectively, of the combustor 14, the turbine nozzle vanes 15 and the turbine blades 16 and cools the above components in an appropriate manner.

Figure 2:
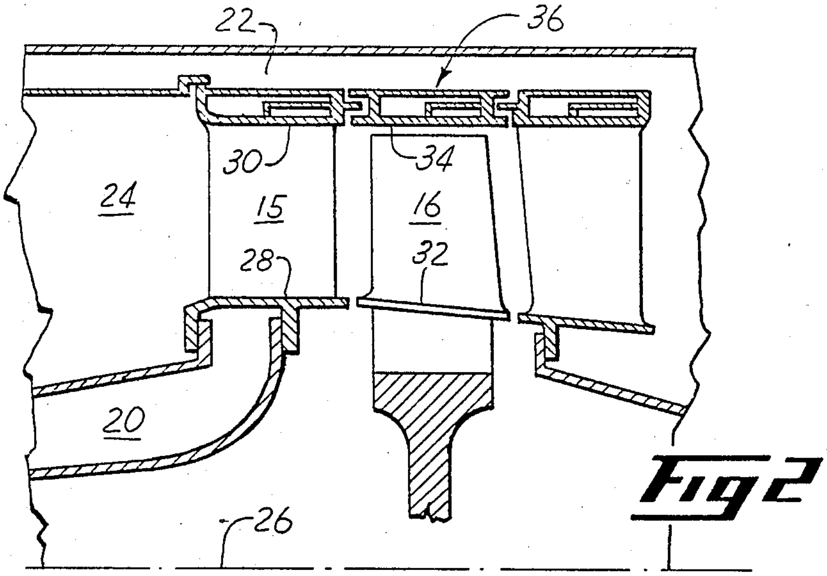
FIG. 2 is a cross-sectional view of a portion of the turbine section of a gas turbine engine incorporating features of the present invention.

As can best be seen in FIG. 2, the turbine nozzle vanes 15 and the turbine blades 16 are disposed within a gas flowpath 24 through which the hot gases flow after they exit the combustor 14. The gas flowpath 24 is defined by radially inner and outer boundaries. By "radial" is meant in a direction generally perpendicular to the engine centerline, designated by the dashed line 26.

The gas flowpath boundaries at the nozzle vanes 15 are defined by generally annular structures, preferably the nozzle inner and outer bands 28 and 30, respectively. The gas flowpath boundaries at the turbine blades 16 are also defined by generally annular structures, preferably by the blade platforms 32 and the shroud 34.

Because the nozzle inner and outer bands 28 and 30, the blade platforms 32 and the shroud 34 are exposed to the high temperature gases within the gas flowpath 24, they must be cooled in order to reduce structural damage, such as through thermal expansion, and to maintain satisfactory sealing characteristics. The high pressure cooling air flowing through the plenums 20 and 22 can be employed for such cooling in a manner to be described hereinafter.

The present invention comprises a multiple-impingement cooled structure such as for use in defining a boundary of a gas flowpath. The structure is configured to receive a high pressure cooling fluid, such as air, and to appropriately direct the fluid to impinge in a sequential manner upon the portions of an element of the structure which is exposed to the gas flowpath.

Figure 3:
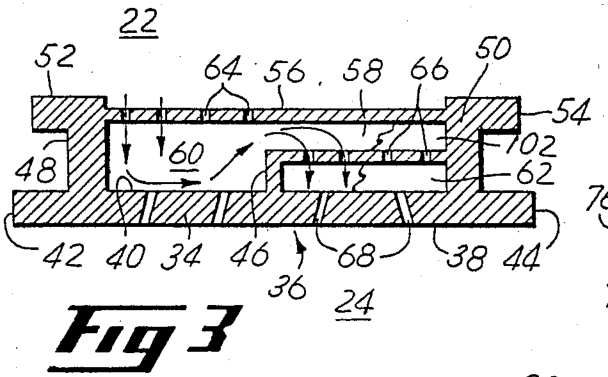
FIG. 3 is a cross-sectional view of one embodiment of a shroud assembly of the present invention.

FIG. 3 shows the structure of the present invention employed as a shroud assembly 36 which includes as one of its elements the shroud 34. It is to be understood, however, that the present invention can also be successfully employed as a turbine nozzle band assembly or in any other appropriate manner where it is desired to cool an element exposed to high temperature.

As can be seen in FIG. 3, the structure, or shroud assembly 36, comprises an element, such as the shroud 34, including an inner surface 38 facing toward the gas flowpath 24 and an outer surface 40 facing away from the gas flowpath 24. The element, or shroud 34, also includes upstream and downstream edges 42 and 44, respectively. By "upstream" is meant in a direction from which the gases in the gas flowpath 24 flow as they approach the structure. By "downstream" is meant in a direction toward which the gases flow as they depart the structure.

The shroud 34 and shroud assembly 36 are shaped so as to properly define a boundary of the gas flowpath 24. In the case of a gas turbine engine such as that shown in FIGS. 1 and 2, the shroud 34 and the shroud assembly 36 are generally annular, more particularly the shroud 34 being generally cylindrically shaped, because the gas flowpath 24 has a generally annular shape. The shroud assembly 36 can be circumferentially continuous or it can comprise a plurality of circumferentially adjacent shroud assembly segments, in the latter case the shroud 34 being arcuate.

Again referring to FIG. 3, the element or shroud 34 includes at least one rib 46 extending from the outer surface 40 and generally parallel to the downstream edge 44. The rib 46 is preferably disposed on the shroud approximately near the center of the shroud. The function of the rib 46 will be explained hereinafter.

The structure, or shroud assembly 36, further comprises an upstream flange 48 and a downstream flange 50 disposed on opposite sides of the rib 46 and extending outwardly from the outer surface 40 of the element, or shroud 34. Preferably, the upstream and downstream flanges 48 and 50 extend from the shroud 34 at or near the upstream and downstream edges 42 and 44, respectively, thereof. When the shroud assembly 36 is generally annular, the upstream and downstream flanges extend in a generally radial direction. If necessary for enabling attachment of the shroud assembly 36 to another member, the upstream and downstream flanges 48 and 50 can include lips 52 and 54, respectively.

A first baffle 56 extends between the upstream and downstream flanges 48 and 50 and is spaced from the element, or shroud 34, and from the rib 46. A second baffle 58 extends between the downstream flange 50 and the rib 46 and is spaced between the first baffle 56 and the element, or shroud 34.

A first cavity 60 is defined within the shroud assembly 36 by the first baffle 56, the upstream and downstream flanges 48 and 50, an upstream portion of the shroud 34, the rib 46 and the second baffle 58. A second cavity 62 is defined within the shroud assembly 36 by the second baffle 58, the rib 46, the downstream flange 50, and a downstream portion of the shroud 34.

The first baffle 56 includes a plurality of impingement holes 64 through only a portion thereof for directing impingement cooling air from a source, such as the plenum 22 which is exterior to the structure, against the portion of the element, or shroud 34, within the first cavity 60. In the configuration shown in FIG. 3, the impingement cooling air flowing through the impingement holes 64 would be directed against only the upstream portion of the shroud 34.

The second baffle 58 also includes a plurality of impingement holes 66 therethrough for directing impingement cooling air from the first cavity 60 against the portion of the element, or shroud 34, within the second cavity 62. In the configuration shown in FIG. 3, the impingement cooling air flowing through the impingement holes 66 would be directed against only the downstream portion of the shroud 34.

Thus, the primary advantage of this multiple-impingement cooling arrangement over prior art single impingement cooling arrangements is that the first and second baffles 56 and 58 are arranged such that together they direct cooling air to impinge sequentially upon the portion of the element, or shroud 34, within the first cavity 60 and then upon the portion of the element within the second cavity 62. That is, the coolant flow through the first baffle 56 is concentrated such that it impinges only upon the upstream portion of the shroud 34 and then the coolant flow is concentrated again such that it impinges only upon the downstream portion of the shroud 34. In comparison, prior art single impingement cooling arrangements would disperse the equivalent coolant flow to impinge upon the entire shroud at one time. As a result, the same coolant flow through the present invention would provide greater cooling than prior art arrangements, or, less coolant flow would be required in the present invention to provide the equivalent cooling of prior art arrangements. A reduced requirement of cooling air correspondingly increases engine efficiency.

The structure, or shroud assembly 36, also comprises fluid communication means between at least one of the cavities 60 or 62 and the exterior of the structure so as to provide a means for the cooling air to exit the structure. Such fluid communication means is necessary to maintain the pressure within the cavities 60 and 62 lower than the pressure at the coolant source so that the cooling air will continue to flow into the cavities. As can be seen in FIG. 3, the fluid communication means can comprise a plurality of film cooling holes 68 through the shroud 34. Cooling air flows from the cavities 60 and 62 through the film cooling holes 68 so as to provide a film of cooling air along the inner surface 38 of the shroud. The cooling air which exits the first cavity 60 through the film cooling hole 68 will thereby not be available to flow into the second cavity 62. Therefore, the number and sizes of the film cooling holes are selected such that there remains an adequate amount of cooling air to flow into the second cavity 62 to impinge upon a portion of the shroud 34 therein.

Because of the improvement in cooling of the element, or shroud 34, by the earlier described multiple-impingement cooling arrangement, film cooling of the shroud may not be required at all, or, if it is required, fewer film cooling holes 68 are required than on previous shroud configurations. Thus, mixing losses resulting from mixing of the film cooling air with the gases flowing through the gas flowpath 24 are also reduced and turbine efficiency increases.

Although the relative positions of the first and second cavities 60 and 62 within the structure, or shroud assembly 36, can be as desired, it is preferable that they be as shown in FIG. 3. The temperature of the gases flowing through the gas flowpath 24 decreases in a downstream direction as work is extracted from the gases. Thus, the upstream portion of the shroud 34 will be subjected to higher temperatures than the downstream portion. It is preferable, therefore, that the upstream portion of the shroud 34 receive the initial impingement cooling air in the first cavity 60 since the initial cooling air entering the first cavity will be cooler and of greater amount than when it enters the second cavity 62.

Figure 4:
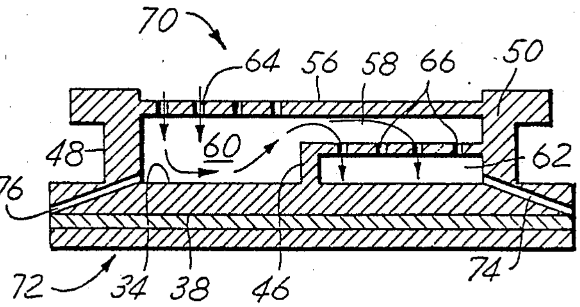
FIG. 4 is a cross-sectional view of another embodiment of the shroud assembly of the present invention.

Refering now to FIG. 4, there is shown another embodiment of the structure of the present invention. This embodiment is similar to that shown in FIG. 3 and the same numbers are used to identify identical elements. The embodiment of the structure, or shroud assembly 70, shown in FIG. 4 comprises an element, or shroud 34, a rib 46, upstream and downstream flanges 48 and 50 and first and second baffles 56 and 58 including impingement cooling holes 64 and 66, respectively, therethrough. The structure, or shroud assembly 70, further comprises a thermal coating 72 on the inner surface 38 of the shroud 34 to improve thermal protection of the shroud. Any appropriate thermal coating can be employed, such as, for example, the thermal barrier coating described in U.S. Pat. No. 4,055,705-Stecura et al, 1977, the disclosure of which is incorporated herein by reference. Preferably, there are no film cooling holes included in this embodiment and thereby mixing losses are greatly reduced and turbine efficiency correspondingly increases.

The structure, or shroud assembly 70, includes a plurality of bleed holes 74 spaced along and extending through the downstream flange 50 so as to provide fluid communication between the second cavity 62 and the exterior of the shroud assembly 70 to permit the cooling air to exit the structure. If desired, the shroud assembly 70 can also include a plurality of bleed holes 76 spaced along and extending through the upstream flange 48 to likewise provide fluid communication between the first cavity 60 and the exterior of the shroud assembly. Although the bleed holes 74 and 76 are shown as employed in the embodiment of FIG. 4, they can also be employed in the embodiment shown in FIG. 3, either in place of or in addition to the film cooling holes 68 shown therein.

Figure 5:
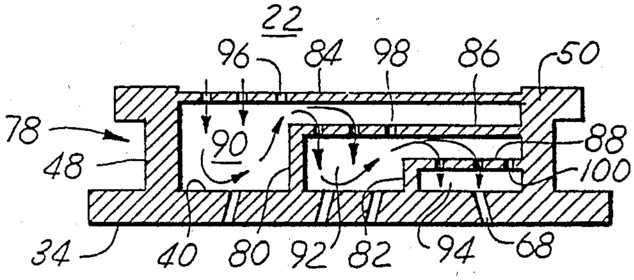
FIG. 5 is a cross-sectional view of yet another embodiment of the shroud assembly of the present invention.

Turning now to FIG. 5, there is shown another embodiment of the structure of the present invention. This embodiment is similar to that shown in FIG. 3 and the same numbers will be used to identify identical elements. The structure, or shroud assembly 78, comprises an element, or shroud 34, and upstream and downstream flanges 48 and 50. However, rather than including only one rib, the embodiment shown in FIG. 5 includes an upstream rib 80 and a downstream rib 82 disposed between the flanges 48 and 50, each rib extending from the outer surface 40 of the element, or shroud 34. Although the spacing of the upstream and downstream ribs 80 and 82 on the shroud 34 can be as desired, it is preferable that the ribs be disposed at locations on the shroud which are approximately one third of the distance between the upstream and downstream flanges 48 and 50, such that the element, or shroud 34, is divided into three substantially equal portions.

The structure, or shroud assembly 78, comprises three baffles: a first baffle 84 extending between the upstream and downstream flanges 48 and 50 and spaced from the shroud 34 and from the upstream and downstream ribs 80 and 82, a second baffle 86 extending between the upstream rib 80 and the downstream flange 50 and spaced between the first baffle 84 and the shroud 34, and a third baffle 88 extending between the downstream rib 82 and the downstream flange 50 and spaced between the second baffle 86 and the shroud 34.

Thus, three cavities are defined within the structure, or shroud assembly 78. A first cavity 90 is defined by the first baffle 84, the upstream and downstream flanges 48 and 50, and upstream portion of the element, or shroud 34, the upstream rib 80 and the second baffle 86. A second cavity 92 is defined by the second baffle 86, the upstream rib 80, the downstream flange 50, the center portion of the shroud 34, the downstream rib 82, and the third baffle 88. A third cavity 94 is defined by the third baffle 88, the downstream rib 82, the downstream flange 50, and the downstream portion of the shroud 34.

The first, second and third baffles 84, 86 and 88 include impingement holes 96, 98 and 100, respectively, therethrough. Cooling air from a source, such as the plenum 22, is directed by the impingement holes 96 in the first baffle 84 to impinge upon the portion of the shroud 34 within the first cavity 90. That cooling air is then directed by the impingement holes 98 in the second baffle 86 to impinge upon a portion of the shroud 34 within the second cavity 92. That cooling air is then again directed by the impingement holes in the third baffle 88 to impinge upon the portion of the shroud 34 within the third cavity 94.

The structure, or shroud assembly 78, also includes fluid communication means between at least one of the cavities and the exterior of the structure to permit cooling fluid to exit the structure. Such fluid communication means can comprise the film cooling holes 68 shown in FIG. 5, or, if desired, bleed holes extending through the upstream and downstream flanges 48 and 50, similar to those shown in FIG. 4.

The cavities within the structure of any of the above-described embodiments can either be continuous around the entire structure or, when the structure is segmented, the cavities can be segmented. When the structure of the present invention comprises a generally annular shroud assembly or nozzle band assembly which comprises a plurality of circumferentially adjacent shroud assembly segments or nozzle band assembly segments, respectively, it may be preferable that the cavities, such as the first and second cavities 60 and 62 shown in FIG. 3, include an end wall 102 at each circumferential end thereof to reduce cooling air leakage between segments.

It is to be understood that this invention is not limited to the particular embodiments disclosed and it is intended to cover all modifications coming within the true spirit and scope of this invention as claimed. For example, although the embodiments of the structure of the invention have been described as including two or three baffles and cavities therein, the structure could be modified to include four or more baffles and cavities.

We claim:

1. In a shroud which defines a flowpath for hot gases in a gas turbine engine, the improvement comprising:

(a) means for directing airstreams against a first shroud portion for impingement cooling thereof and (b) means for collecting some of the air of (a) after impingement and redirecting the collected air against a second shroud portion for impingement cooling thereof.

2. In a gas turbine engine having a shroud having an inner surface which is heated by hot gases, a method of removing heat from the inner surface, comprising the following steps:

(a) passing cooling air through a first cavity by the use of impingement cooling;

(b) transferring heat from the inner surface along a first path to cooling air within the first cavity;

(c) passing at least some of the cooling air of (b) through a second cavity;

(d) transferring heat from the inner surface along a second path to the cooling air within the second cavity by the use of impingement cooling;

wherein the first and second paths are approximately the same length.

3. A multiple-impingement cooled shroud assembly for defining the radially outer boundary of a gas flowpath and comprising a plurality of circumferentially adjacent shroud assembly segments, each of said segments comprising:

(a) an arcuate shroud including upstream and downstream edges and a rib extending radially outwardly from near the center of said shroud and parallel to said downstream edge thereof;

(b) upstream and downstream flanges extending generally radially outwardly from said shroud at near said upstream and said downstream edges, respectively, thereof;

(c) a first baffle and a second baffle, said first baffle extending between said upstream and said downstream flanges and spaced radially outwardly of said shroud, of said rib and of said second baffle for defining therewith a first cavity, said second baffle extending between said rib and said downstream flange and spaced between said first baffle and said shroud for defining therewith a second cavity, said first baffle and said second baffle each including a plurality of impingement holes therethrough for directing cooling air from a source thereof to impinge sequentially upon the portion of said shroud within said first cavity and then upon the portion of said shroud within said second cavity; and (d) fluid communication means between at least said second cavity and the exterior of said shroud assembly.

4. The shroud assembly of claim 3 further comprising a thermal coating on the radially inner surface of said shroud.

* * * * *